United States Patent [19]

Satake

[11] Patent Number: 5,196,944
[45] Date of Patent: Mar. 23, 1993

[54] FACSIMILE APPARATUS
[75] Inventor: Yoshiaki Satake, Ebina, Japan
[73] Assignee: Ricoh Company, Ltd., Tokyo, Japan
[21] Appl. No.: 625,423
[22] Filed: Dec. 11, 1990
[30] Foreign Application Priority Data
   Dec. 18, 1989 [JP] Japan .................................. 1-325837
[51] Int. Cl.$^5$ .............................................. H04N 1/40
[52] U.S. Cl. ............................. 358/404; 358/406; 358/444; 358/468
[58] Field of Search ............... 358/406, 404, 444, 439, 358/434, 436, 468; 340/825.34; 380/18, 23

[56] References Cited

U.S. PATENT DOCUMENTS

| | | | |
|---|---|---|---|
| 4,900,902 | 2/1990 | Sakakibara | 358/468 |
| 4,965,676 | 10/1990 | Ejiri et al. | 358/406 |
| 5,048,078 | 9/1991 | Satomi et al. | 379/100 |
| 5,048,085 | 9/1991 | Abraham et al. | 380/23 |
| 5,060,264 | 10/1991 | Muellner et al. | 380/23 |

FOREIGN PATENT DOCUMENTS 3921617 1/1990 Fed. Rep. of Germany .

Primary Examiner—Edward L. Coles, Sr.
Assistant Examiner—Fan Lee
Attorney, Agent, or Firm—Oblon, Spivak, McClelland, Maier & Neustadt

[57] ABSTRACT

A facsimile apparatus has a switch which determines whether or not the facsimile apparatus functions as a remote terminal for remote maintenance. When the facsimile apparatus functions as a remote terminal, it is accessed by the center apparatus so that the center apparatus can read and/or rewrite internal data stored in the facsimile apparatus. If an user does not desire the access, the switch is pushed so that the facsimile does not function as a remote terminal.

8 Claims, 11 Drawing Sheets

| ITEM NUMBER | ITEM NAME | REMOTE FLAG | DATA-STORED ADDRESS |
|---|---|---|---|
| 1 | ONE-TOUCH DIAL | OFF | AD001-AD002 |
| 2 | MANUSCRIPT -SENSOR | ON | AD003-AD004 |
| ⋮ | ⋮ | ⋮ | ⋮ |

*FIG. 3(a)*

| I.D. NUMBER |
|---|
| 5431 |
| 2324 |
| ⋮ |

*FIG. 3(b)*

| ITEM NUMBER | ITEM NAME | REMOTE FLAG | OPERATIONAL LEVEL | DATA-STORED ADDRESS |
|---|---|---|---|---|
| 1 | ONE-TOUCH DIAL | OFF | 3 | AD001-AD002 |
| 2 | MANUSCRIPT -SENSOR | ON | 1 | AD003-AD004 |
| ⋮ | ⋮ | ⋮ | ⋮ | ⋮ |

*FIG. 3(c)*

| I.D. NUMBER | OPERATIONAL LEVEL |
|---|---|
| 5431 | 3 |
| 2324 | 1 |
| ⋮ | ⋮ |

*FIG. 3(d)*

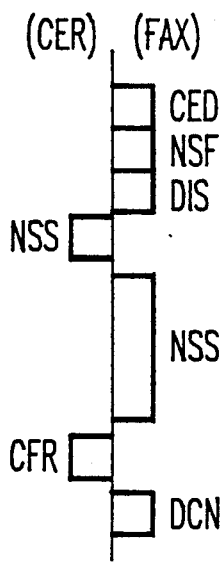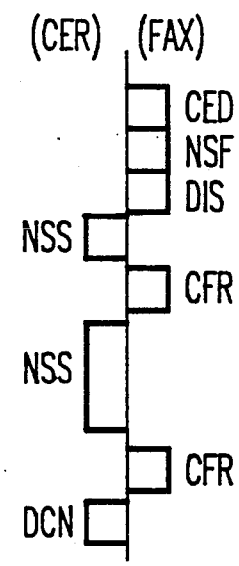
FIG. 4(a)   FIG. 4(b)
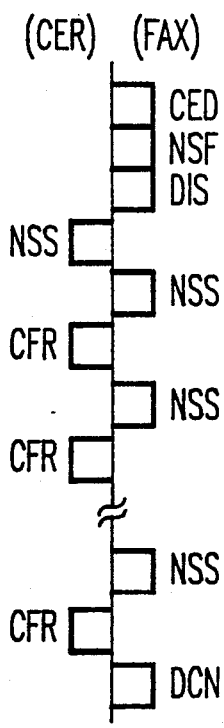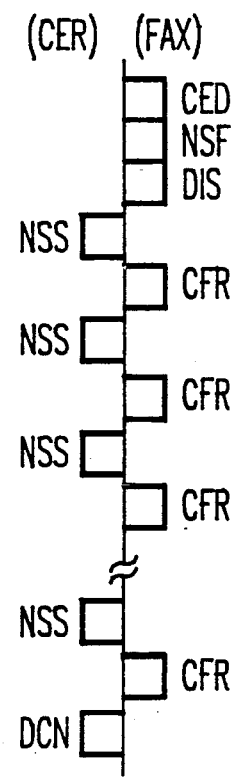
FIG. 4(c)   FIG. 4(d)

FACSIMILE APPARATUS

BACKGROUND OF THE INVENTION

The present invention relates generally to facsimile apparatuses, and more particularly to a facsimile apparatus functionable as a remote terminal for remote maintenance.

Recently, facsimile apparatuses have been so improved that use of practical facsimile apparatuses, which have variable functions, but are inexpensive have become widespread among users. But the users, who have insufficient previous knowledge about new products, usually cannot make full use of the variable functions. Additionally, long-term use often deteriorates the performance of each part of the apparatus, such as sensors or light sources. Accordingly, a facsimile apparatus functionable as a remote terminal for remote maintenance has been used so that engineers in a remote maintenance center can diagnose damage thereof and/or periodically inspect the performance thereof.

However, the above facsimile apparatus has the following disadvantages:

1. Remote control without the permission of the user of the apparatus sometimes constitutes an invasion of the user's privacy, for example, names of communicatees registered with the one-touch-dial data are leaked.

2. There is a possibility that the remote control will make the apparatus function wrongly, for example, set parameters, which are required for the apparatus operation, incorrectly.

SUMMARY OF THE INVENTION

Accordingly, it is a general object of the present invention to provide a novel and useful facsimile apparatus in which the above disadvantages are eliminated.

Another object of the present invention is to provide a facsimile apparatus functionable as a remote terminal which is never operated by the remote control against the user's desire.

Another more specific object of the present invention is to provide a facsimile apparatus which comprises memory means for storing predetermined data, setting means for setting the predetermined data to be in one of a first state and a second state, and control means, coupled to said memory means and setting means, for authorizing an access from an exterior of the facsimile apparatus to the predetermined data when the predetermined data are set to be in the first state by said setting means, and for unauthorizing the access to the predetermined data when the predetermined data are set to be in the second state by said setting means.

According to the present invention, the access from the exterior of the facsimile apparatus is authorized only when the setting means sets the first state to the predetermined data. Therefore, remote control against the user's desire can be prevented by means of the setting means.

Other objects and further features of the present invention will be apparent from the following detailed description when read in conjunction with the accompanying drawings.

BRIEF DESCRIPTION OF THE DRAWINGS

FIG.3(a) is a view showing one example of a remote control item table;

FIG.3(b) is a view showing one example of an administrator ID table;

FIG.3(c) is a view showing another example of the remote control item table;

FIG.3(d) is a view showing another example of the administrator ID table;

FIG.4(a) is a time chart showing one example of a reading memory process;

FIG.4(b) is a time chart showing one example of a writing memory process;

FIG.4(c) is a time chart showing another example of the reading memory process;

FIG.4(d) is a time chart showing another example of a writing memory process;

DESCRIPTION OF PREFERRED EMBODIMENTS

Figure 1:
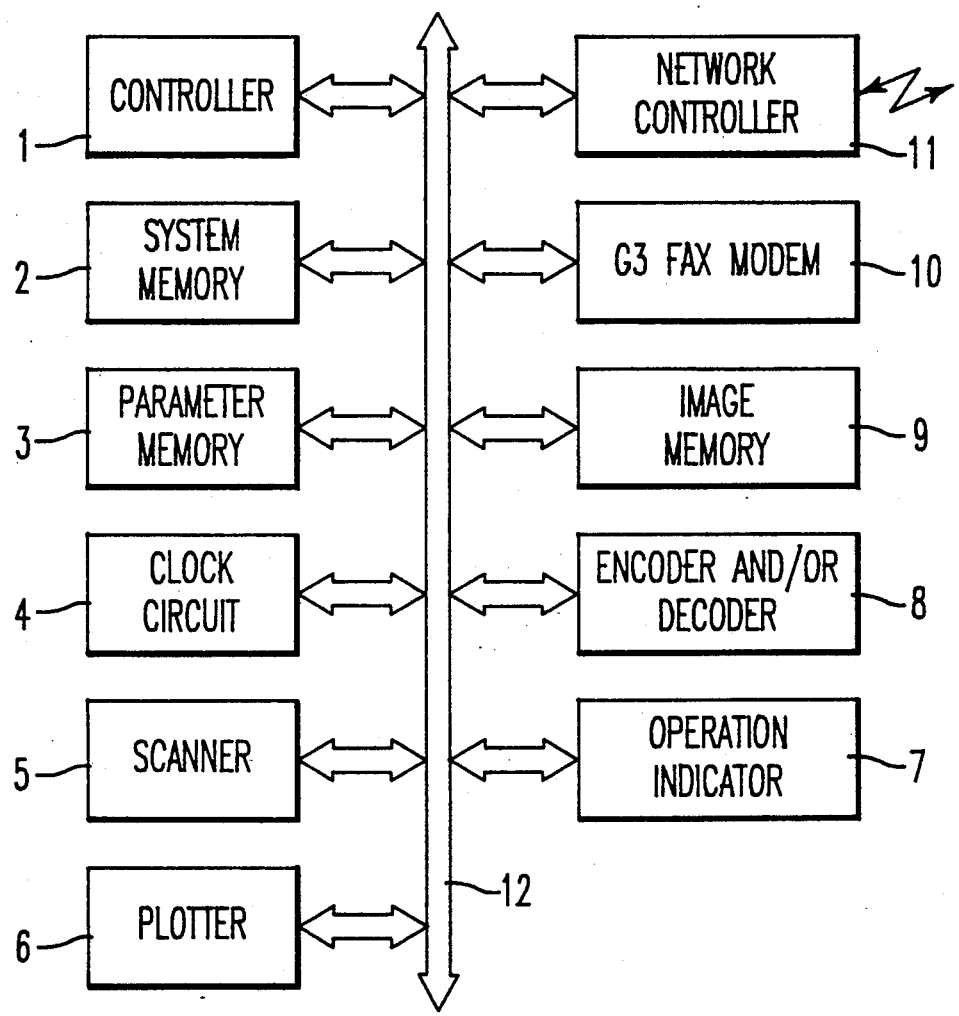
FIG.1 is a block diagram of a facsimile apparatus of a first embodiment according to the present invention.

A facsimile apparatus, as shown in FIG.1, comprises a controller 1, a system memory 2, a parameter memory 3, a clock circuit 4, a scanner 5, a plotter 6, an operation indicator 7, an encoder and/or decoder 8, an image memory 9, a group 3 facsimile apparatus modem (called G3 FAX modem for short) 10, a network controller 11 and a system bus 12. The controller 1 executes a control process for each part of the facsimile apparatus, and executes the facsimile transmission control procedures. The system memory 2 stores a program used for the control process executed by the controller 1, and various data required for executing the control process. The system memory 2 constitutes a work area of the controller 1. The parameter memory 3 stores various information peculiar to the facsimile apparatus.

The clock circuit 4 gives the present time. The scanner 5 scans a predetermined image with a predetermined resolution. The plotter 6 outputs the predetermined image with the predetermined resolution. The operation indicator 7 indicates the operation of the facsimile apparatus, which indicator comprises various operation keys and indicators. The encoder and/or decoder 8 encodes image signals to form compressed image information and/or decodes the compressed image information to form the image signals. The image memory 9 stores the compressed image information.

The G3 FAX modem 10 has a low sped modem function (V.21 modem) used for transmission control procedure signals and a high speed modem function (V.29 modem, V.27ter modem) mainly used for image information. The network controller 11 connects the facsimile apparatus to a public telephone-type network. The controller 1, system memory 2, parameter memory 3, clock circuit 4, scanner 5, plotter 6, operation indicator 7, encoder and/or decoder 8, image memory 9, G3 FAX modem 10 and network controller 11 are coupled to the system bus 12, respectively, so as to be connected with one another. In addition, the network controller 11 and the G3 FAX modem 10 are directly connected with each other.

Figure 2:
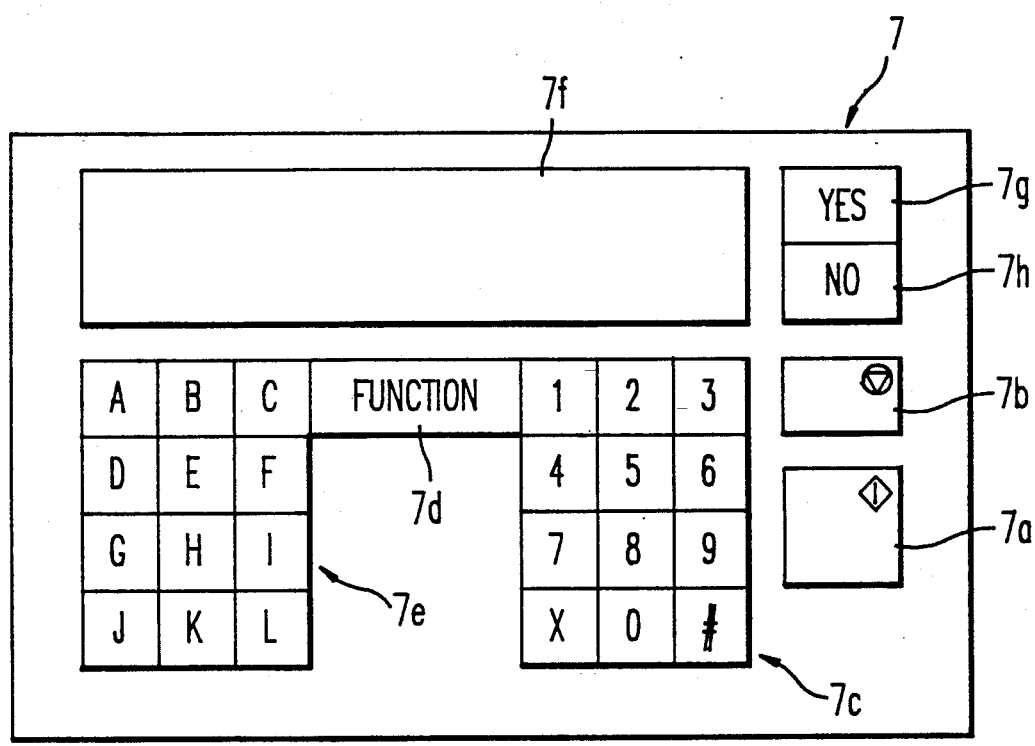
FIG.2 is a view showing an operation indicator.

The operation indicator 7, as shown in FIG.2, comprises a start key 7a, a stop key 7b, a ten key 7c, function keys 7d, one-touch key 7e, a liquid crystal indicator 7f, a YES key 7g, and a NO key 7h.

The start key 7a starts various operations of the facsimile apparatus and the stop key 7b stops the execution of the operations. The number keys 7c inputs numeral information, for example, telephone numbers. The function key 7d selects a function from among the various functions which the apparatus is equipped with and executes it. The one-touch key 7e inputs both an address and an telephone number only by one operation. The liquid crystal indicator 7f indicates the various messages, and the YES key 7g is pushed to affirm the message, while the NO key 7h is pushed to deny the message.

FIG.3(a) shows an example of a remote control item table memorized in the parameter memory 3. The remote control item table comprises item numbers, item names, remote flags, and data-stored addresses. Each of the remote flags indicate whether or not the remote control is authorized. The data-stored address indicates the address of the region in which the data appropriate to the predetermined item are stored. The remote flags were set in an off state, which indicates that the remote control is unauthorized, when the facsimile apparatus was shipped. However, whether or not the remote flags are set to be in the off state is a matter of choice. Therefore, they may be preset to be in the on state and the user may reset their state respectively. So the user must reset each remote flag blank in an on state, respectively. Namely, the user must operate the function keys 7d and number keys 7c to make the liquid crystal indicator 7f indicate the remote control item table, and then, selects a predetermined item number to reset the remote flag corresponding to the predetermined item number.

The parameter memory 3 also stores a table of the controller identification number (called ID number for short) which identifies the remote-controller. The ID number which is registered in the ID number table was preset when the facsimile apparatus was shipped. The ID number table may be rewritten by the users.

The controller 1 sets the authorizing flags (not shown), which indicate whether or not the remote control is authorized, in the off state which indicates the unauthorization the moment the current source is turned on.

The user must apply to a remote control service in the center, and operate the function keys 7d and ten key 7c to authorize the remote control. Then, the controller 1 sets the authorization flag blanks to be in an on state.

The following description will now be given of remote control by the center while the facsimile apparatus authorizes the remote control. When the center reads internal data of the facsimile apparatus, as shown in FIG.4(a), a center apparatus (called CER for short) calls out the facsimile apparatus (called FAX for short). In response to the calling-out of the CER, the FAX responds with the called station identification (called CED for short), the non-standard facilities (called NSF for short), and the digital identification signal (called DIS for short). The CED indicates the FAX is a speechless terminal of the CER. The NSF gives the non-standard functions which the FAX is equipped with. The DIS gives the standard functions which the FAX is equipped with. Thereupon, the NSF includes information saying that the FAX authorizes the remote control and that the remote flags are respectively allotted to the items in the remote control item table. When a predetermined remote flag is in the off state, data [0] is substituted for a predetermined bit corresponding to the predetermined remote flag, while data [1] is substituted therefore when the predetermined remote flag is in the on state.

In response to them, the CER transmits the ID number, the instruction code which gives instructions on the reading of the data, and the non-standard facilities set-up (called NSS for short) to the FAX. The NSS includes address information for specifying the addressed region which is to be read. Since the authorization flag is preset in the on state, the FAX reads out the internal data of the addressed region specified by the NSS so as to transmit the NSS to the information field.

If the CE normally receives the NSS from the FAX, it transmits the confirmation to receive (called CFR for short) to the FAX. As a result, the FAX transmits the disconnect (called DCN for short) so as to release the lines. When the CER receives the DCN, the lines are released. Thus, the CER can read the internal data of the FAX.

A description will now be given of a process by which the CER rewrites the internal data of the FAX with reference to FIG.4(b). The CER transmits the ID number, the instruction code which gives instruction on the writing of the data, and the NSS to the information field. The NSS includes address information for specifying the addressed region which is to be written. Since the authorization flag is preset in the on state, the FAX responds with the CFR so that the CER transmits the NSS in which the data used for writing is set in the information field. Normally receiving the NSS, the FAX transmits the CFR, and then, writes down the data at a predetermined addressed region. Receiving the CFR, the CER transmits the DCN so as to release the lines. Receiving the DCN, the FAX releases the lines. Thus, the CER rewrites the internal data of the FAX.

During the communication between the CER and the FAX, transmission data is divided so as to be coupled with the NSS and transmitted together, as shown in FIG.4(c) and FIG.4(d).

Figure 5:
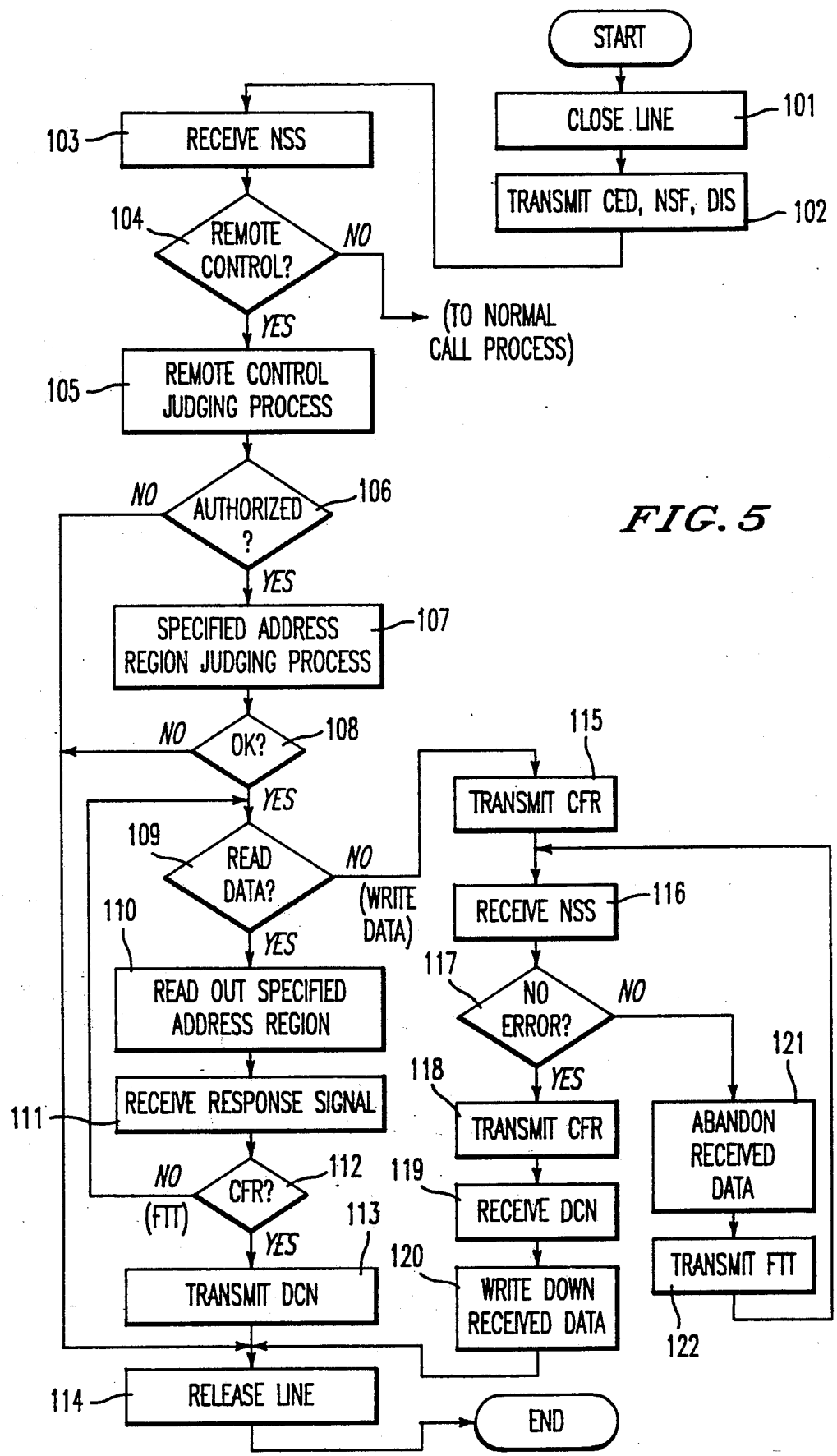
FIG.5 is a flow chart of the facsimile apparatus operation when the facsimile apparatus detects a call.

FIG.5 shows an operational process of the FAX when the FAX detects a call. Firstly, a step 101 closes the line so that a step 102 transmits the CED the NSF and the DIS. Then, a step 103 receives the NSS which is transmitted by the communicatee. A step 104 analyzes the content of the NSS so as to judge whether or not the remote control has been preset. If the step 104 judges NO, then the process is transferred to a normal call operational process. But if the step 104 judges YES, a step 105 executes the remote control judging process so as to judge whether or not the remote control is authorized. Subsequently, a step 106 judges whether or not the judging result by the step 105 is "authorized". If the step 106 judges YES, a step 107 executes the addressed region judgment process 107 so as to judge whether or not the address specified by the NSS is included in the data stored address corresponding to the remote flags which are set in the on state, in the remote control item table. Next, a step 108 judges whether or not the judging result of the addressed region judgment process 107 is "OK". If the step 108 judges YES, a step 109 judges whether or not a specified process is a data-reading process. If the step 109 judges YES, a step 110 reads out the internal data of the specified addressed region to transmit the NSS which is set in the information field. Then, a step 111 receives a response signal from the communicatee. A step 112 judges whether or not the response signal is CFR. If the step 112 judges YES, then a step 113 transmits the DCN, and a step 114 releases the lines. But if the response signal indicates the failure to train (called FTT for short) so that the step 112 judges NO, the process is fed back to the step 110 so as to receive the NSS.

If the data-writing instruction is preset by the CER so that the step 109 judges NO, then a step 115 transmits the CFR, and then a step 116 receives the NSS from the communicatee. A step 117 judges whether or not the NSS includes any error. If the step 117 judges YES, then a step 118 transmits the CFR, and a step 119 receives the DCN so that a step 120 writes down the data at the specified addressed region. Then, the process is fed back to the process 114 so as to release the line. If the step 117 judges NO, then a step 121 abandons the received data so that a step 122 transmits the FTT. In this case, the process is fed back to the step 116 so as to receive the NSS again. If the step 106 judges NO, or the step 108 judges NO, then, the process is transferred to the step 114 so as to release the lines; consequently, the remote control is unauthorized.

Figure 6:
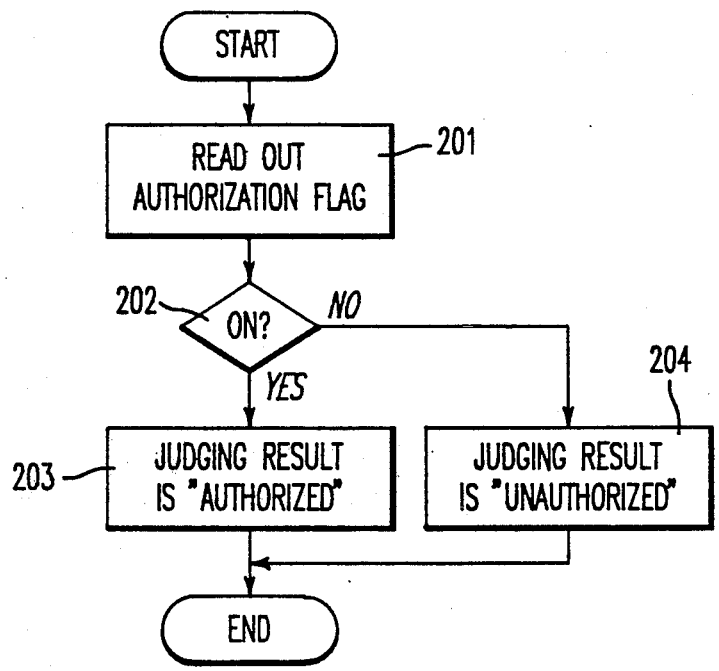
FIG.6 is a flow chart of an example of a remote control judgment process.

A description will now be given of the remote control judging process 105 with reference to FIG.6. In this case the authorization flags are set to be in the on or off state by the users. Firstly, a step 201 reads a predetermined authorization flag, and a step 202 judges whether or not the authorization flag is in the on state. If the step 202 judges YES, then a step 203 sets the judging result to be an "authorized". If the step 202 judges NO, a step 204 sets the judging result to be "unauthorized".

There are the following five methods to authorize and/or unauthorize the remote control besides the above-mentioned method in which the user directly sets the authorization flags to be in the on and/or off state.

Figure 7:
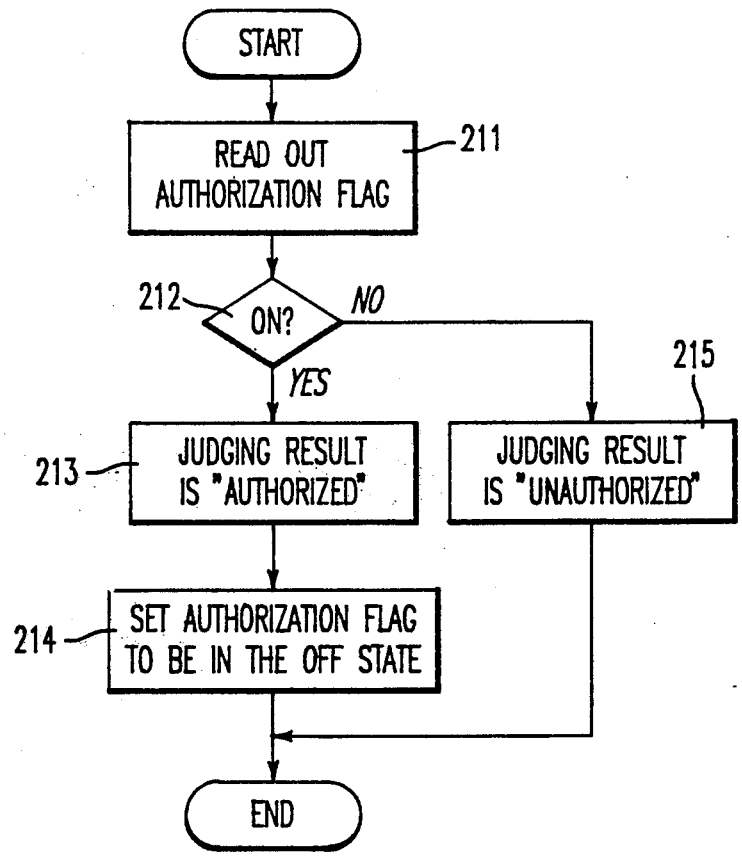
FIG.7 is a flow chart of another example of the remote control judgment process.

1. The first method is to correlate the remote control with the setting of the authorization flags to be in the off state so that the authorization flags are automatically set to be in the off state at the moment the remote control is over. This method can perform the troublesome operation of the setting the authorization flags to be in the off state by the user. A description will now be given of the remote control judgment process 105 in this case with reference to FIG.7. Firstly, a step 211 reads the authorization flags so that a step 212 judges whether or not the authorization flags are set to be in the on state. If the step 212 judges YES, a step 213 sets the judging result to be "authorized", and subsequently, a step 214 sets the authorization flags to be in the off state. If the step 212 judges NO, then a step 215 sets the judging result to be "unauthorized".

Figure 8:
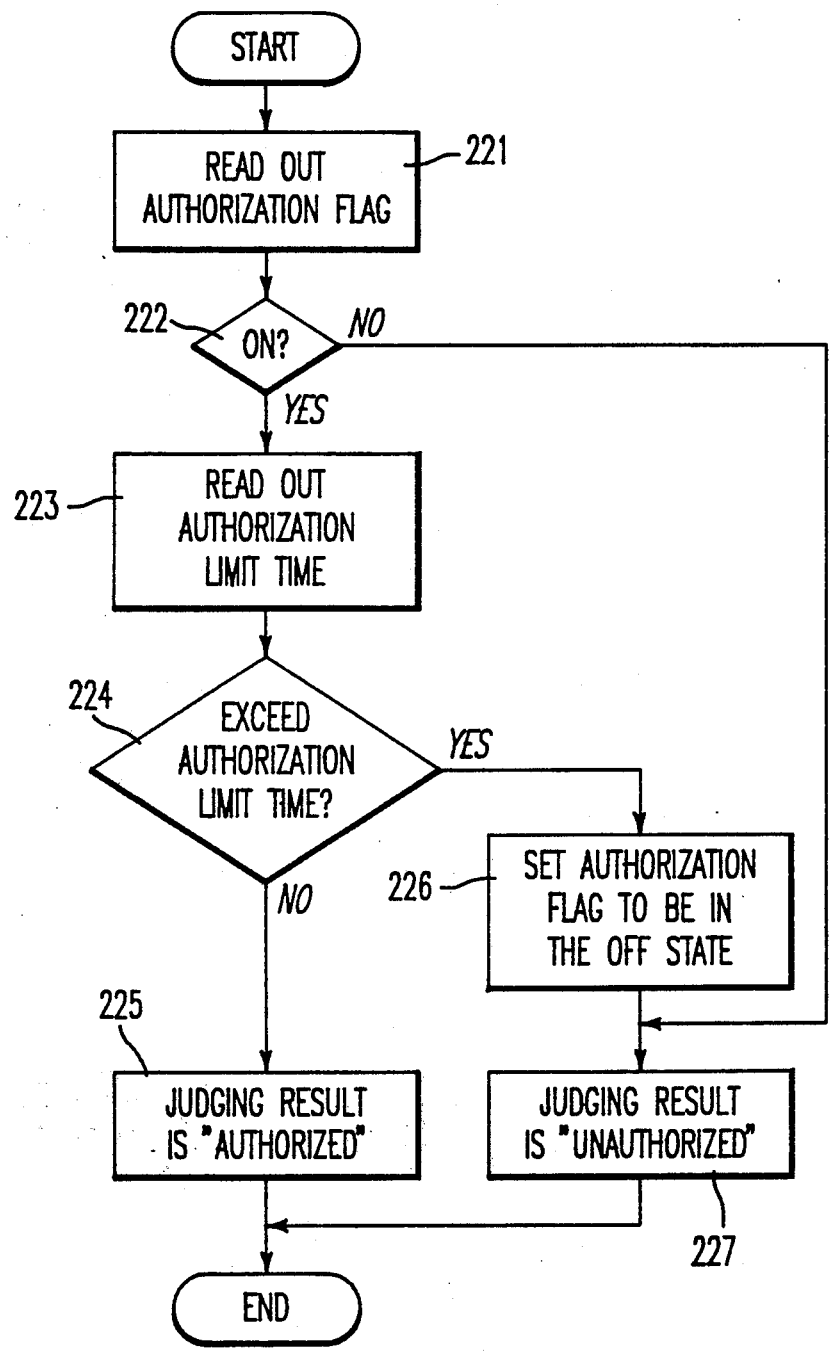
FIG.8 is a flow chart of still another example of the remote control judgment process.

2. The second method is to correlate the remote control with time so that the remote control which incomes after a predetermined time has passed since the user has set the authorization flags to be in the on state is unauthorized. A description will now be given of the remote control judgment process 105 in this case with reference to FIG.8. Firstly, a step 221 reads the authorization flags so that a step 222 judges whether or not the authorization flags are set to be in the on state. If the step 222 judges YES, then a step 223 reads the authorization limit time which corresponds to the predetermined time described above. Subsequently, a step 224 judges whether or not the present time exceeds the authorization limit time. If the step 224 judges NO, a step 225 sets the judging result to be "authorized". On the other hand, if the step 224 judges YES, a step 226 sets the authorization flags to be in the off state so that a step 227 sets the judging result to be "unauthorized". If the step 222 judges NO, the process is transferred to the step 227 so as to set the judging result to be "unauthorized".

Figure 9:
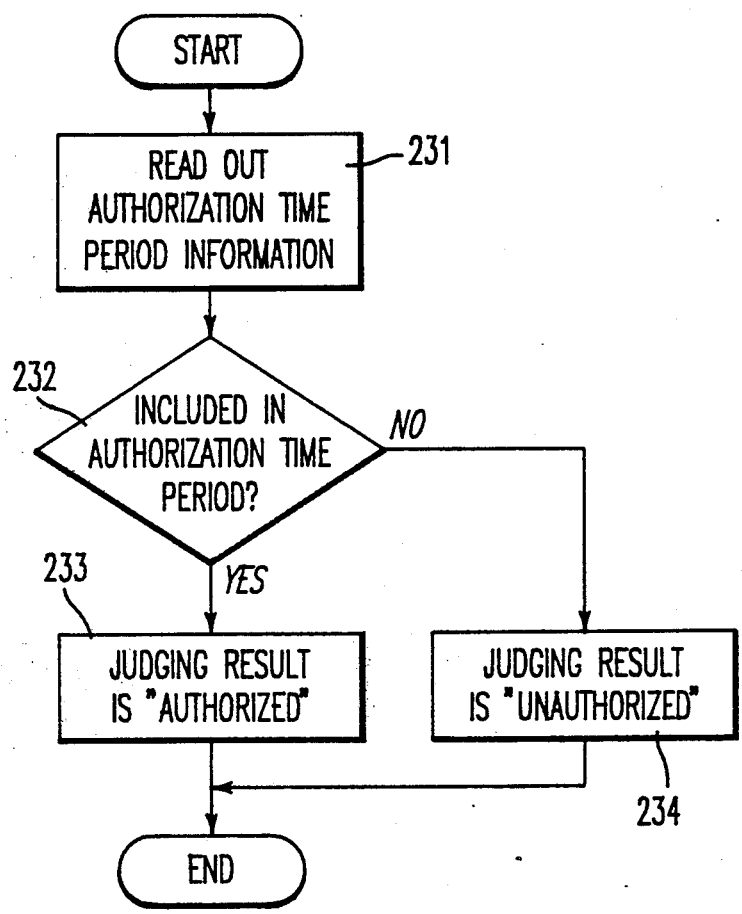
FIG.9 is a flow chart of still one more example of the remote control judgment process.

3. The third method is to establish a predetermined time period in which the remote control is authorized so that the user inputs a start time and an end time which determines the time period. A description will now be given of the remote control judgment process 105 in this case with reference to FIG.9. Firstly, a step 231 reads out the authorization time period information which gives the predetermined time period described above so that a step 232 judges whether or not the present time, which is based on the present time information from the clock circuit 4, is included in the authorization time period. If the step 232 judges YES, then a step 233 sets the judging result to be "authorized". On the other hand, if the step 232 judges NO, then a step 234 sets the judging result to be "unauthorized".

Figure 10:
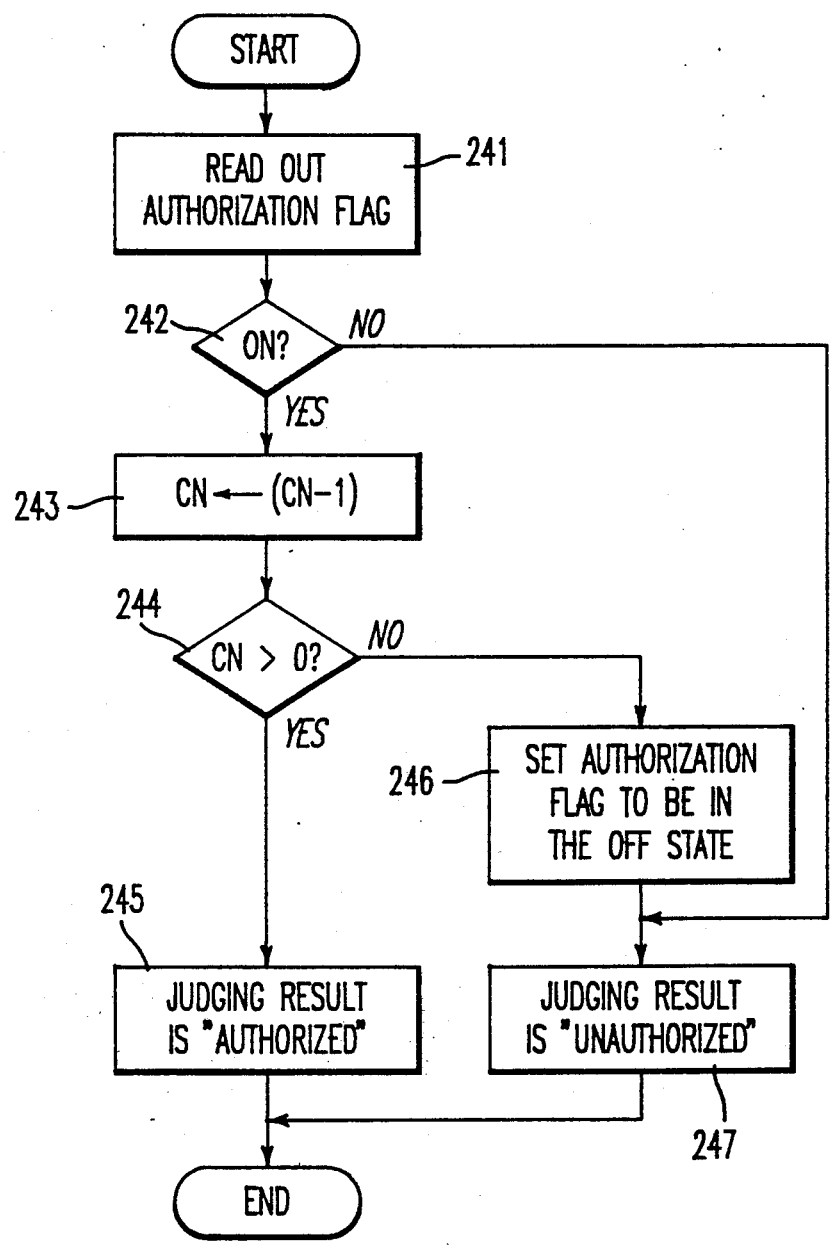
FIG.10 is a flow chart of one more example of the remote control judgment process.

4. The fourth method is to count a predetermined number of times the remote control is authorized. A description will now be given of the remote control judgment process 105 in this case with reference to FIG.10. Firstly, a step 241 reads out the authorization flags so that a step 242 judges whether or not the authorization flags are set to be in the on state. If the step 242 judges YES, then a step 243 counts the predetermined number of times by means of an authorized number of times counter (called CN for short) so that the step 243 substitutes CN-1 for CN. Next, a step 244 judges whether or not the CN is greater than 0. If the step 244 judges YES, a step 245 sets the judging result to be "authorized". On the other hand, if the step 244 judges NO, a step 246 sets the authorization flags to be in the off state, and a step 247 sets the judging result to be "unauthorized". If the authorization flags are set to be in the off state so that the step 242 judges NO, then the process is transferred to the step 247 so as to set the judging result to be "unauthorized".

5. The fifth method is to correlate the remote control with the ID number so that the remote control is authorized only when the ID number given by the CER is registered in the ID number table. A description will now be given of the remote control judgment process 105 in this case with reference to FIG.11. Firstly, a step 251 extracts the ID number from the ID number table so that a step 252 judges whether or not the extracted ID number corresponds to the ID number given by the CER. If the step 252 judges YES, then a step 253 sets the judging result to be "authorized". If the step 252 judges NO, then a step 254 judges whether or not the ID number given by the CER is collated with all ID numbers in the ID number table. Therefore, if the step 254 judges NO, a step 255 extracts another ID number from the ID number table so that the process is transferred to the step 252. If the step 254 judges YES, then a step 256 sets the judging result to be "unauthorized".

Figure 11:
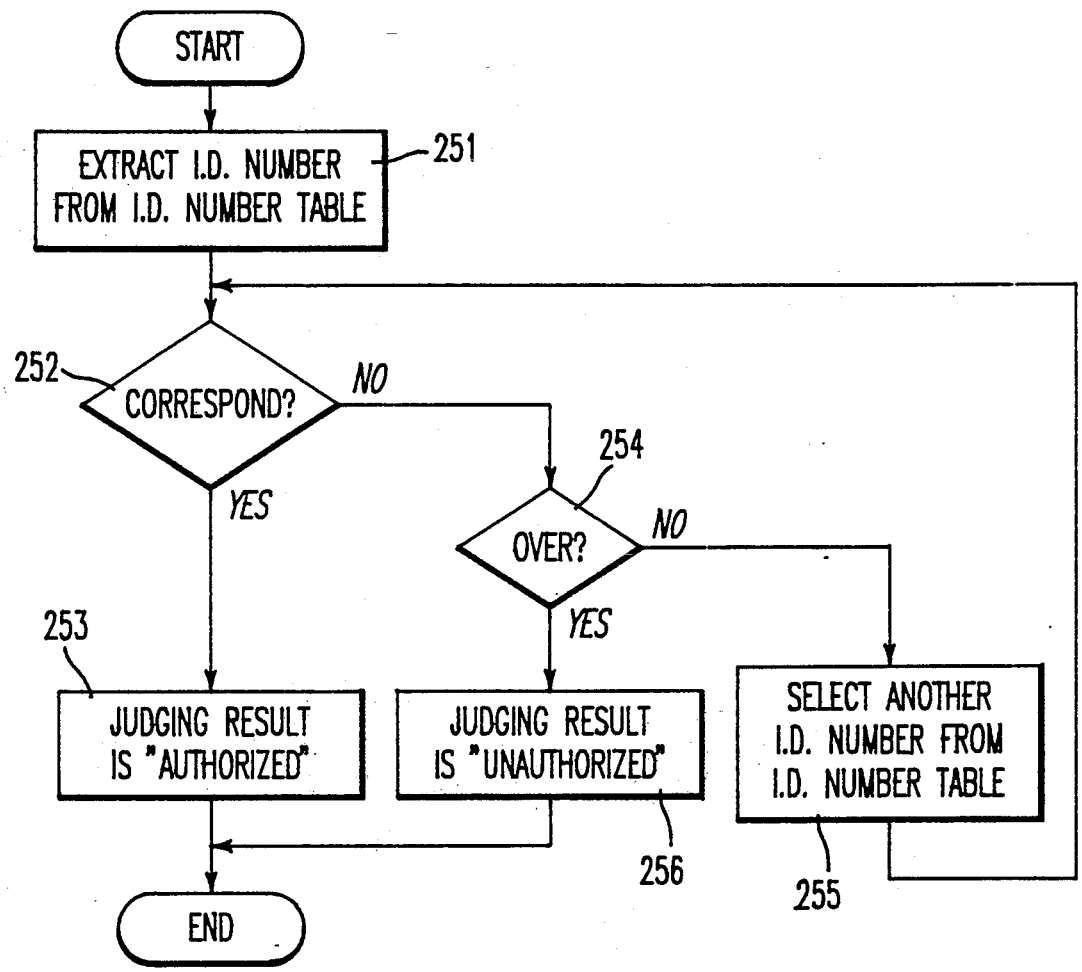
FIG.11 is a flow chart of another example of the remote control judgment process.
Figure 12:
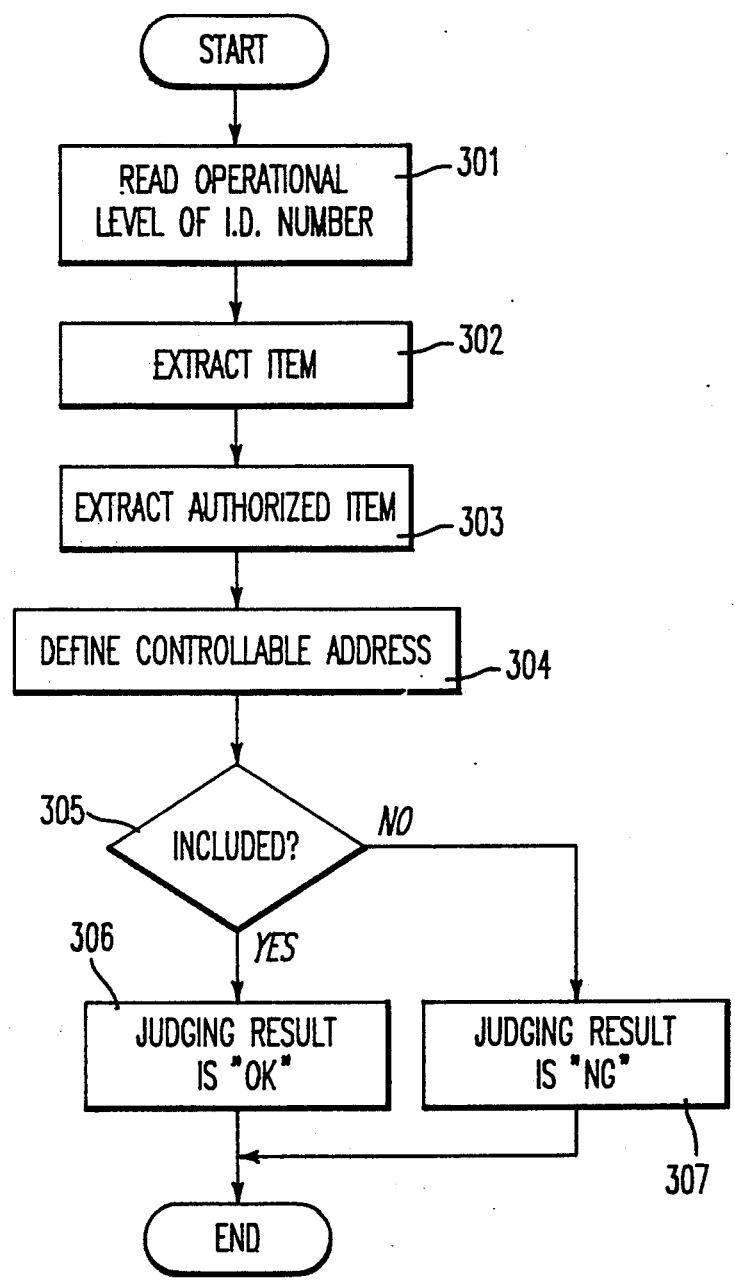
FIG.12 is a flow chart showing an example of an addressed region judgment process.

The controllers of the CER and the contents of the remote control may be graded so that the contents of the remote control are correlated with the grades of the controllers, respectively. Therefore, the controllers and the remote control items are graded by means of operational levels, for example. If the items relate to the maintenance of the apparatus, they are graded as having the operational level [1]. If the items relate to internal systems, they are graded as having the operational level [2]. And if the items relate to user parameters, they are graded as having the operational level [3]. Controllers having the operational level [1] can control the items having operational level [1]. Controllers having the operational level [2] can control the items having operation level [1] or [2]. And controllers having the operational level [3] can control the items having operational level [1], [2] or [3]. In this case, the operational level blanks are added to the remote control item table and the ID number table. Operational level information, which indicates the operation levels described above, serves as the addressed region which is used for the addressed region judgment process 107. Namely, as shown in FIG.12, a step 301 reads the operational level of the ID number from the NSS in the ID number table so that a step 302 extracts the item corresponding to the operational level from the remote control item table. If the operational level is [1], the items having the operational level [1] are extracted. If the operational level is [2], the items having the operational level [1] or [2] are extracted. If the operational level is [3], the items having the operational level [1], [2] or [3] are extracted. Subsequently, a step 303 extracts the items in which the authorization flag is set to be in the on state. Then, a step 304 defines the data-stored address of the item having the authorization flag in the on state as being a controllable address, and gathers all the items so as to establish a controllable addressed region. Next, a step 305 judges whether or not the operational addressed region includes the specified addressed region. If the step 305 judges YES, a step 306 sets the judging result to be "OK", while the step 307 sets the judging result to be "NG" if the step 305 judges NO. The addressed region judgment process 107 is particularly valid when the process shown in FIG.11 is executed in the remote control judgment process 105. The process shown in FIG.12 may be executed when the process shown in FIG.11 and another process are combined in the remote control judgment process 105.

Incidentally, unlike the above embodiments in which one kind of process is executed for the remote control judging process 105, a plurality of processes may be combined. Particularly, it is valid to combine processes which collate the ID number with each other.

In the above embodiments, if the specified addressed region is not included as a whole in the remote controllable addressed region, the lines are released so as to end the remote control process. However, only in the data-reading case, if a part of the specified addressed region is included in the remote controllable addressed region, data only corresponding to the part may be read out.

Incidentally, the above embodiments are applied to the group 3 facsimile apparatus, however, the present invention may be applicable to group 4 facsimile apparatus.

Further, the present invention is not limited to these preferred embodiments, but various variations and modifications may be made without departing from the scope of the present invention.

What is claimed is:

1. A facsimile apparatus comprising:
   memory means for storing predetermined data;
   setting means for setting the predetermined data to be in one of a first state and a second state;
   control means, coupled to said memory means and setting means, for authorizing an access from an exterior of the facsimile apparatus to the predetermined data when the predetermined data are set to be in the first state by said setting means, and for unauthorizing the access to the predetermined data when the predetermined data are set to be in the second state by said setting means; and
   wherein said setting means further comprises count means for counting a predetermined number of times the access is performed so that said setting means sets the predetermined data to be in the second state after the count means counts the predetermined number of times the access is performed, said control means authorizing the access until the counting means counts the predetermined number of times.

2. A facsimile apparatus according to claim 1, wherein said setting means sets the predetermined data to be in the second state after the access to the predetermined data is finished.

3. A facsimile apparatus according to claim 1, wherein said setting means further comprises first clock means for clocking a predetermined time period since said setting means sets the predetermined data to be in the first state so that said setting means sets the predetermined data to be in the second state after the first clock means clocks the predetermined time period, said control means authorizing the access only during the predetermined time period since said setting means sets the predetermined data to be in the first state.

4. A facsimile apparatus according to claim 1, wherein said setting means further comprises a second clock means for clocking present time so that said setting means sets the predetermined data to be in the first state when the second clock means clocks a start time and sets the predetermined data to be in the second state when the second clock means clocks an end time, said control means authorizing the access during a time period from the start time to the end time.

5. A facsimile apparatus according to claim 1, wherein the predetermined data comprises a plurality of data and said setting means sets each data of the plurality of data to be in one of the first state and the second state.

6. A facsimile apparatus according to claim 1, wherein said setting means further sets each data of a plurality of data to be in a predetermined initial state the moment electricity is supplied to said facsimile apparatus, the predetermined initial state being one of the first state and the second state.

7. A facsimile apparatus according to claim 1, wherein said facsimile apparatus further comprises controller identification means for identifying controllers who perform the access to the predetermined data, said control means authorizing an access to the predetermined data when a controller of the access is identified by said controller identification means.

8. A facsimile apparatus according to claim 7, wherein said controller identification means further comprises grade means for grading each of the controllers and each data of a plurality of data as having a predetermined level, respectively, control means authorizing the access to each data of a plurality of data when a grade of the controller of the access is higher than a grade of each data of a plurality of data.

* * * * *